A. J. MATHEWS.
WAGON BRAKE.
APPLICATION FILED JULY 2, 1913.
1,122,405.
Patented Dec. 29, 1914.
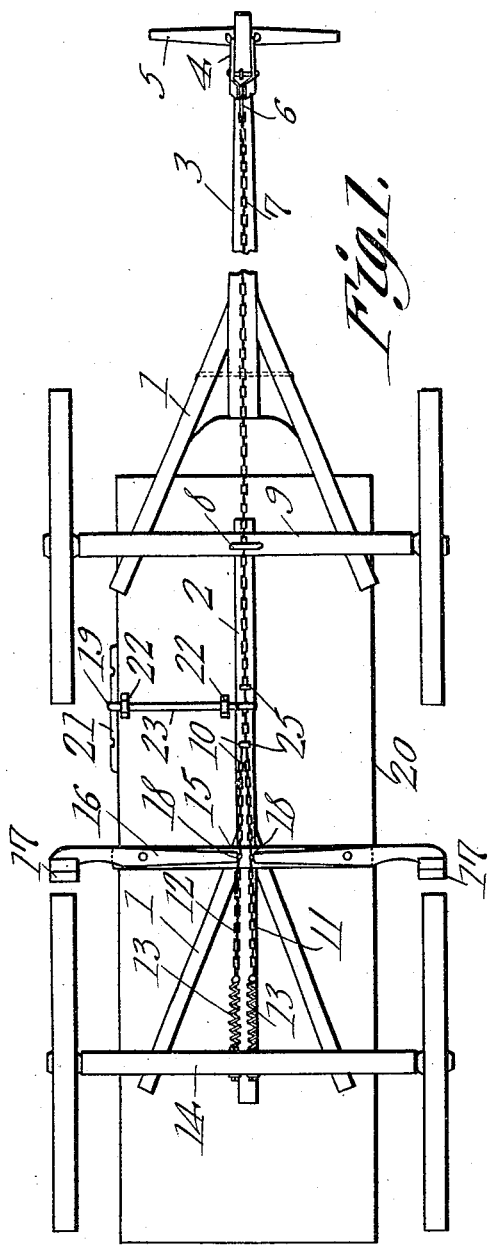
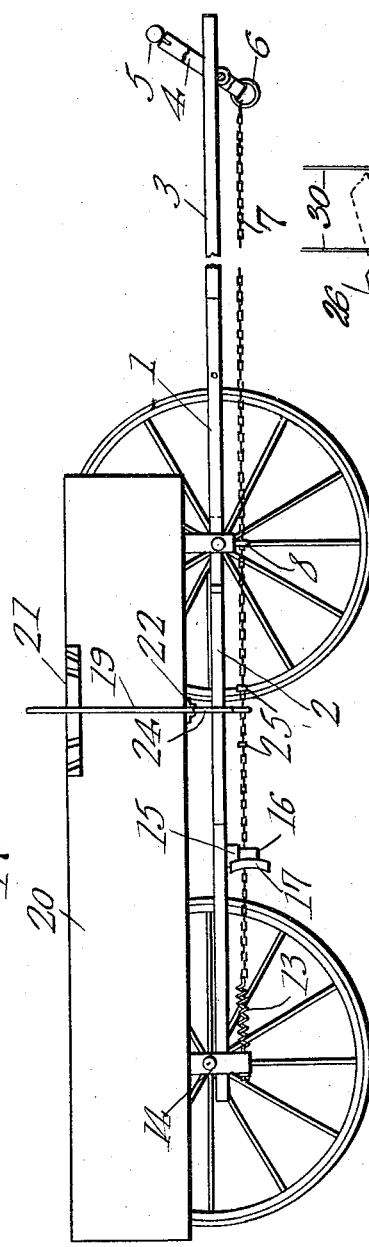
A. J. Mathews,
Inventor
Witnesses
by C. A. Snow & Co.,
Attorneys

UNITED STATES PATENT OFFICE.

ANDREW J. MATHEWS, OF VILLISCA, IOWA.

WAGON-BRAKE.

1,122,405.  Specification of Letters Patent.  Patented Dec. 29, 1914.

Application filed July 2, 1913.  Serial No. 777,086.

*To all whom it may concern:*

Be it known that I, ANDREW J. MATHEWS, a citizen of the United States, residing at Villisca, in the county of Montgomery and State of Iowa, have invented a new and useful Wagon-Brake, of which the following is a specification.

This invention relates to improvements in wagon brakes and more particularly to that class of brakes which are applied by the holding back of the draft animals.

An object of the present invention is to provide an improved wagon brake in which a neck yoke is carried by a pivoted lever, to the lower extremity of which lever is secured a flexible element in the form of a chain which extends rearwardly and engages the adjacent extremities of two pivoted levers, the last mentioned levers carrying upon their outer extremities suitable brake shoes adapted to contact with the rear wheels of the vehicle. The neck yoke carrying lever and the brake shoe carrying levers are positioned in substantial alinement and with the chain which extends therebetween substantially parallel to the tongue and reach of the vehicle.

A further object is to provide a lever pivotally secured to the running gear of the vehicle and engaging suitable stops upon the said brake applying chain or flexible element so that the brake may be locked out of contact with the wheels for the backing of the vehicle, may be locked in contact with the wheels for holding the vehicle stationary, and further providing a means whereby the brake may be applied by hand either for the applying of the brake independent of the draft animals or for the assisting the latter in the application of the brake.

A further object is to provide two pivoted brake levers carrying brake shoes upon their outer extremities and the securing of tensional springs to the inner adjacent extremities of said brake levers whereby the brake shoes will be normally held out of contact with the vehicle wheels.

A further object is to provide a brake applying means in which the force is transmitted to two brake levers by a flexible element which is bifurcated at its rear extremity so that any inequalities in the wear of the two brakes will be properly allowed for.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a bottom plan view of a vehicle with my improved brake attached thereto. Fig. 2 is a view in side elevation of the above. Fig. 3 is a perspective view of a device which can be attached or secured to the running gear of a wagon and used to operate the brake when the wagon body 20 is removed.

Referring to the drawings in which similar reference numerals designate corresponding parts throughout the several views, 1 are the hounds of a vehicle between which extends the reach rod 2, in alinement with which is the forwardly extending tongue 3.

Pivotally secured to the front extremity of the tongue is the neck yoke carrying lever 4, the same extending above and below the tongue and supporting at its upper extremity the neck yoke 5. A ring 6 is secured to the lower extremity of the lever 4 and to which is secured the flexible element 7, illustrated in the present drawings as taking the form of a chain, for which a suitable guide 8 is secured to the front axle 9. The flexible element or chain 7 extends rearwardly substantially parallel to the tongue and reach of the vehicle and divides as at 10 to form the two separate portions 11 and 12. The extreme ends of the portions 11 and 12 are secured to the tensional springs 13, the remote ends of which are rigidly secured to the rear vehicle axle 14.

Extending transversely of the running gear of the vehicle and rigidly secured to the rear hounds and the reach is the bar 15, the same being spaced a slight distance in advance of the rear wheels. Pivotally secured to the bar 15 adjacent the outer extremities thereof are the separate brake levers 16 carrying upon their outer extremities the brake shoes 17 which are adapted to contact with the rear wheels. Secured to the adjacent and inner extremities of the brake levers 16 are the eye bolts 18 which engage corresponding links of the portions 11 and 12 of the flexible chain element. Thus a holding back of the draft animals will actuate the lever 4 to draw the chain 7 forwardly with the result that the pivoted brake levers will be rotated for the applying of the brake shoes 17 to the rear wheels.

Mention is made of the fact that the provision of the flexible element with the rearwardly extending portions 11 and 12 compensates for any unequal wear in the brake shoes 17. Thus for instance, should the brake lever to which the portion 11 is connected contact first with the wheel, there will be a tendency for the chain 7 and portion 11 thereof to come into alinement and which will result in the further application of the brake lever to which the portion 12 of the chain is secured.

In order that the brake shoes may be locked in contact with the rear vehicle wheels or held from contact therewith, a brake actuating lever 19 is provided and extends up the side of the wagon box 20 and engages the notched rack bar 21 which is secured thereto. Rigidly secured to the under portion of the wagon box 20 are the bearings 22 in which is journaled the shaft portion 23 of the manually operable brake actuating lever or handle 19. The shaft 23 is bent downwardly as at 24 through which extends a suitable aperture of a size sufficient to accommodate and slidably dispose the chain 7 therein. Rigidly secured to the chain 7 and spaced a distance apart and arranged at each side of the lever 24 are the stops or blocks 25 which provide means for the engagement of the chain 7 with the manually operable brake actuating handle 19. The stops are so disposed that with the top portion of the handle 19 moved forwardly, the portion 24 thereof will contact with the rear stop and prevent the applying of the brake regardless of the force exerted upon the neck yoke 5. With the handle in the central or what might be termed the neutral position the lever 24 does not in any way influence the operation of the device. However, when the handle 19 is drawn rearwardly, the lowermost portion 24 thereof will contact with the forward stop and apply the brake, the force of application depending upon which of the rack bar notches the lever 19 is positioned within. Thus the operator can readily control the brakes or may so adjust the device that they will be automatically applied by the draft animals. Furthermore, by reason of the tensional springs 13, the brake shoes will be quickly drawn from contact with the wheels when the force is removed from the brake applying chain 7.

When the wagon running gear is to be used without the wagon body 20 such as when hay is to be transported and similar uses, the device illustrated in Fig. 3 is employed and which comprises a box-like sleeve 26 which is split so that it may be secured to and detached from the reach rod 2. Extending from and pivotally secured to the sleeve 26 is a shaft 27 to the outer extremity of which are secured the outstanding arms 28—28. Extending downward and then inward from the shaft 27 is the brake actuating member 29 which takes the place of the shaft and downward extension 23 and 24 previously described. Secured to the outer extremities of the arms 28—28 are the ropes or cables 30 by which means the brake may be operated at a distance.

Having thus fully described the invention what I claim to be new and original with me is:—

The combination with a vehicle running gear, of brake levers pivotally secured thereto and adapted to frictionally engage the rear wheels thereof, a flexible element extending along the central longitudinal axis of said vehicle, means secured to the front extremity of said flexible element and carried by the vehicle tongue adapted to produce a tensional stress therein by the holding back of the draft animals, connecting means engaging the said flexible element and the brake levers, a tensional spring secured to the rear extremity of said flexible element and to the vehicle running gear, a pair of spaced stops rigidly secured to the flexible element, manually operable means slidably engaging the flexible element positioned between said stops and adapted to coact therewith, said operable means adapted to hold the brake levers in contact with the vehicle wheels, and adapted to hold the brake levers out of contact with said wheels.

In testimony that I claim the foregoing as my own, I have hereto affixed my signature in the presence of two witnesses.

ANDREW J. MATHEWS.

Witnesses:
 JOHN MATHEWS,
 TOM MATHEWS.

Copies of this patent may be obtained for five cents each, by addressing the "Commissioner of Patents, Washington, D. C."